United States Patent [19]

Florent et al.

[11] Patent Number: 5,671,264
[45] Date of Patent: Sep. 23, 1997

[54] METHOD FOR THE SPATIAL FILTERING OF THE NOISE IN A DIGITAL IMAGE, AND DEVICE FOR CARRYING OUT THE METHOD

[75] Inventors: Raoul Florent, Valenton; Claude Mequio, Villejuif, both of France

[73] Assignee: U.S. Philips Corporation, New York, N.Y.

[21] Appl. No.: 681,100

[22] Filed: Jul. 22, 1996

[30] Foreign Application Priority Data

Jul. 21, 1995 [FR] France ................................. 95 08893

[51] Int. Cl.$^6$ ........................................................ H05G 1/64
[52] U.S. Cl. .............................. 378/98; 250/369; 382/260
[58] Field of Search ............................. 250/369, 370.08, 250/370.09; 378/62, 98; 382/260, 262

[56] References Cited

U.S. PATENT DOCUMENTS

| | | | |
|---|---|---|---|
| 4,694,342 | 9/1987 | Klees | 358/167 |
| 5,533,149 | 7/1996 | Kaplan et al. | 382/260 |

OTHER PUBLICATIONS

"A New Class of Detail–Preserving Filters for Image Processing", By Ari Nieminen et al., IEEE Transactions on Pattern Analysis and Machine Intelligence, vol. PAMI–9, No. 1, Jan. 1987, pp. 74–90.

"Performance Evaluation of Some Noise Reduction Methods", By Wen–Yen Wu et al., In Graphical Models and Image Processings, vol. 54, No.2, Mar. 1992, pp. 134–146.

*Primary Examiner*—David P. Porta
*Assistant Examiner*—David Bruce
*Attorney, Agent, or Firm*—Jack D. Slobod

[57] ABSTRACT

A method for spatial filtering of noise in a digital image includes localization of an instantaneous pixel [$P_0(x_0,y_0)$] having a noisy intensity [$I_0(x_0,y_0)$], definition of a sliding window [$WD(x_0,y_0)$] centered around the instantaneous pixel, selection of a fixed or random number (N), of oriented random elementary filters [$F_1, F_2, \ldots F_N$] having an axis of orientation [$P_0Z_1, P_0Z_2, \ldots, P_0Z_N$] which passes through said instantaneous pixel, and having characteristics, at least one of which is random, including: an orientation angle [$\theta_1, \theta_2, \ldots \theta_N$] between the axis of orientation and a reference axis (OX), and a support size which is defined as a number of pixels, combination of the intensities of the pixels on the supports of the elementary filters individually in order to produce elementary intensities, and combination of the elementary intensities in order to produce a filtered intensity [$R_0(x_0,y_0)$] to be applied to the instantaneous pixel.

An image processing device carries out this method.

20 Claims, 10 Drawing Sheets

METHOD FOR THE SPATIAL FILTERING OF THE NOISE IN A DIGITAL IMAGE, AND DEVICE FOR CARRYING OUT THE METHOD

BACKGROUND OF THE INVENTION

1. Field of the Invention

The invention relates to a method for the spatial filtering of the noise in a digital image and to a device for carrying out the method.

The invention is used particularly for the processing of medical images formed in an X-ray fluoroscopy mode by means of a system utilizing a low-intensity X-ray beam which, consequently, yields low-contrast, noisy images which must be filtered in order to remove the noise, however, without degrading the details.

The X-ray fluoroscopy mode is used, for example for real-time following of a medical operation during which a tool of very small diameter, such as a catheter, is introduced into or displaced within the patient zone being observed.

2. Description of the Related Art

A method for the filtering of the noise in a digital image is already known from the publication "A new class of Detail-Preserving Filters for Image Processing" by Ari Nieminen et al., "IEEE Transactions on Pattern Analysis and Machine Intelligence", Vol. PAMI-9, No. 1, January 1987, pp. 74–90.

The cited publication describes a filtering method which utilizes a new class of spatial filters. This new class comprises impulse response linear filter structures which are referred to as "FIR". The method disclosed in the cited document includes combination of results of linear filters in median filters with several levels of combination. It is taught that such a method enables conservation of the edges of the objects in the image, thus conserving the details. This method includes definition of a sliding window in the digital image to be processed, which window is centered around an instantaneous pixel, and definition of masks in the window to enable formation of a given number of mean values of intensities of pixels situated around the central pixel of the window. For example, a mean value is formed from the intensities of the pixels situated in the same row of pixels as the central pixel, and a mean value is formed from the intensities of the pixels situated in the same column as the central pixel; the mean intensities can also be formed for the pixels on the diagonals of the window which is square in the described example. The averaging results, constituting linear filtering (FIR) or so-called base filtering, are combined in median filters (FMH). For example, the mean values calculated from the intensities of pixels in the row of the central pixel to the left and to the right of the central pixel, respectively, are combined in a median filter with the intensity of the central pixel, yielding a first result; subsequently, the mean values calculated from the pixels in the column of the central pixel in the upward direction and the downward direction, respectively, are combined with the intensity of the central pixel in a median filter, yielding a second result; subsequently, the first and second results are combined in a median filter with the intensity of the central pixel, yielding another result. Depending on the number of base filtering operations in the window and on the number of inputs of the median filters, the number of combination steps for obtaining the result, referred to as combination levels, may be more or less large.

Another method of filtering the noise in a digital image is known from the publication "Performance Evaluation of Some Noise Reduction Methods" by Wen-Yen WU et al., in "Graphical Models and Image Processings", Vol. 54, No. 2, March 1992, pp. 134–146.

This second publication describes various noise filtering methods which include, generally speaking, first the selection, in conformity with given criteria, of pixels in a digital image whose intensity is subject to combination. Such combination may be a linear combination such as a mean value. To this end, the method includes the definition of a sliding window in the digital image to be treated, said window being centered around an instantaneous pixel, and the selection of pixels in the window. A selection criterion may concern the intensity of selected pixels. In one example (SIC) the pixels selected are those whose intensity difference with respect to the instantaneous pixel at the center of the window is less than a given threshold which is dependent on the noise variance ($\sigma^2$); in another example (KNN), a given number of K pixels, having intensities nearest to that of the instantaneous pixel, is selected. After the selection of the pixels in the square sliding window, their intensity is combined either by forming a mean value (MEAN) or by MEDIAN filtering (MED).

A problem encountered in dealing with the noise in fluoroscopic images is that, generally speaking, these images contain very fine details or the representation of very small objects, for example a catheter introduced during the operation, said catheter being shaped as a wire whose transverse dimension amounts to a few pixels. In this field, therefore, it is absolutely necessary to have a noise filtering method available which preserves the details.

All prior art methods described in the cited two publications are capable of filtering the noisy image while preserving the details.

However, all methods known from the cited documents impose the same problem: the images reconstructed by means of these methods exhibit noise patches. This is due to the fact that these methods are based on the use of a sliding window whose center is shifted over one pixel in the image after execution of each set of calculation steps described in both cited publications. Thus, the area of overlap of windows corresponding to two adjacent pixels is large, so that the contribution of the residual noise in these two windows is strongly correlated.

It is an object of the invention to propose a spatial filtering method which does not produce noise patches.

It is a specific object of the invention to propose such a method which is capable of executing a thorough elimination of the noise while preserving the contours of objects in the image and also while preserving the contrast of the image.

These objects are achieved by means of a method for the spatial filtering of noise in an image in the form of a matrix of pixels having noisy digitized intensity values, which method comprises the steps of:

a) selection, in a sliding window centered around an instantaneous pixel, of a number (N≠0) of random oriented elementary filters having supports with an axis of orientation passing through the instantaneous pixel and having characteristics, one or several of which have random values, b) combination of the intensities of pixels on said supports individually, yielding an elementary intensity, and combination of the elementary intensities, yielding a filtered intensity to be applied to the instantaneous pixel.

This method offers the advantage that it does not produce residual noise patches in the images and that it no longer causes the appearance of patterns which are due to the shape of the filter supports.

The method can also be used for a multi-dimensional image, for example a series of successive images or a volume detected by CT or MRI.

A device for assistance in the observation of a medical image comprises:

a system for supplying data of an image in the form of a two-dimensional matrix of pixels having digitized intensity values, a display system for displaying the image, an image processing system having access to the image data and to the display system, which image processing system is arranged to carry out at least the following steps:

a) selection, in a sliding window centered around an instantaneous pixel, of a number (N≠0) of random oriented elementary filters having supports with an axis of orientation passing through the instantaneous pixel and having characteristics, at least one or several of which have random values, b) combination of the intensifies of pixels on said supports individually, yielding an elementary intensity, and combination of elementary intensities, yielding a filtered intensity to be applied to the instantaneous pixel.

This device offers the advantage that it restores a medical image originally low-contrast, and noisy while preserving the finest details and without inducing noise patches.

BRIEF DESCRIPTION OF THE DRAWINGS

The invention will be described in detail hereinafter with reference to the accompanying diagrammatic drawings. Therein.

DESCRIPTION OF THE PREFERRED EMBODIMENTS

I/ X-ray device

Figure 1:
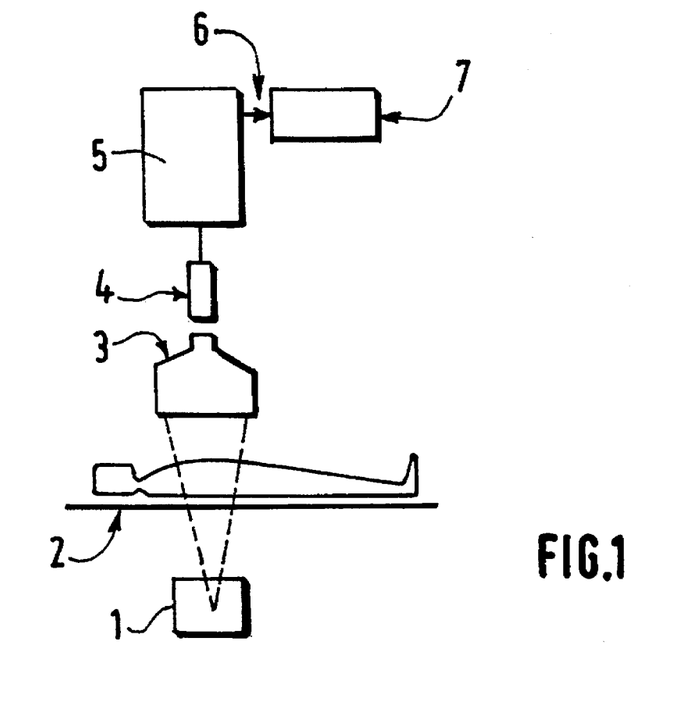
FIG. 1 shows an X-ray device for the formation of X-ray or fluoroscopic images.

FIG. 1 shows a digital radiography system, comprising an X-ray source 1, a mobile table 2 for accommodating a patient, an image intensifier device 3 which is coupled to a camera tube 4 which supplies image data to a system 5 for digital image processing which comprises a microprocessor. The latter comprises a number of outputs, including an output 6 which is coupled to a monitor 7 for the display of radiographic images or intensity images of a patient zone observed.

A digitized radiographic image is formed as a two-dimensional matrix of pixels. The digitized radiographic image may comprise, for example 512×512 or 1024×1024 pixels, encoded on 8 bits or 10 bits. Each pixel can thus be assigned one of 256 or 1024 intensity levels. For example, the dark regions of the image have a low grey level and the bright regions a high grey level.

The digitized image can be obtained in the X-ray fluoroscopy mode. The invention can be used particularly advantageously for the filtering of angiographic images. The images can be picked up as sequences of images at a rate of several images per second, for example 30 images per second in the standard fluoroscopy mode, or 12.5 images per second in the pulsed fluoroscopy mode.

Elimination of the noise without introducing noise patches, therefore, must be performed on each image of the sequence arriving in real time. The filtering method, therefore, must be fast without destroying the details.

It is to be noted, however, that the present invention takes into account neither the method used to obtain the digital image nor the nature of the objects represented therein, but concerns exclusively the filtering of this image, considered alone and not in relation to other images of the sequence, in order to eliminate the noise without introducing noise patches.

II/ Spatial filtering method

Figure 2:
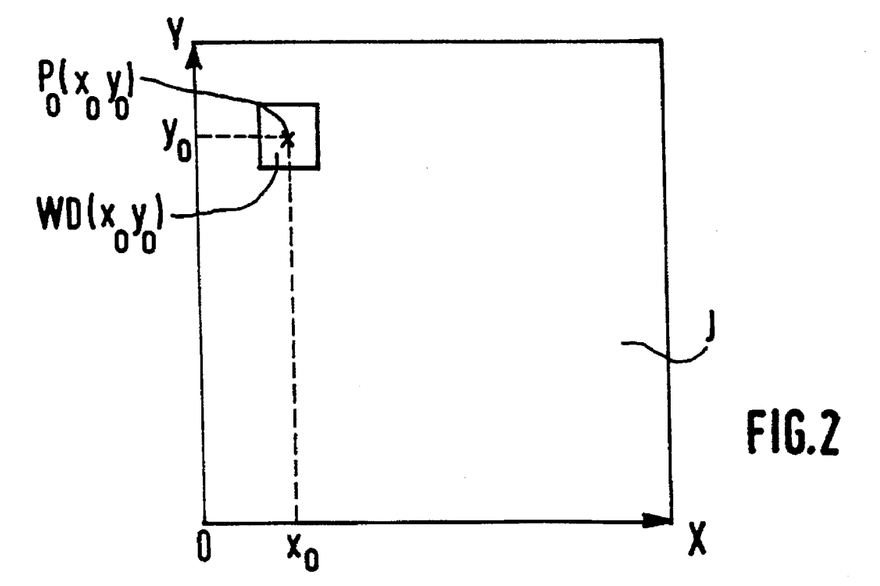
FIG. 2 shows the passage of a window WD(x,y) across a noisy image J.

FIG. 2 illustrates the spatial filtering method which includes the definition, in an image J to be processed, of a pixel which is referred to as the instantaneous pixel $P_0(x_0,y_0)$ having the coordinates $x_0,y_0$ in the two-dimensional matrix of the image J. The intensity $I_0(x_0,y_0)$ of this pixel is assumed to be noisy initially.

For an instantaneous pixel $P_0(x_0,y_0)$ having the intensity $I_0(x_0,y_0)$ in the image J a series consisting of a number of N elementary filters is defined in a sliding window $WD(x_0,y_0)$ which is centered around said instantaneous pixel.

Each of the filters of the series is an oriented filter. An oriented filter is to be understood to mean a filter in which one dimension of its support is much larger than the other dimension, said larger dimension, or length, extending parallel to a so-called axis of orientation which passes through the instantaneous pixel $P_0(x_0,y_0)$, the other dimension, or width, extending perpendicular to said axis. The angle enclosed by the axis of orientation with respect to, for example the direction OX of the rows of the two-dimensional image matrix is the so-called orientation angle θ of the elementary filter.

Thus, the series of elementary filters relating to the instantaneous pixel in the window $WD(x_0,y_0)$ has several characteristics; for example, for each filter:

its orientation angle θ, the size of its support, equal to the number of pixels parallel to the axis of orientation multiplied by the number of pixels perpendicular to said axis, and for the series of filters:

the number N of filters.

Each filter of the series of elementary filters in the window $WD(x_0,y_0)$, linked to the instantaneous pixel $P_0(x_0,y_0)$, comprises at least one characteristic having a random value. Thus, in the window $WD(x_0,y_0)$ centered around the instantaneous pixel $P_0(x_0,y_0)$ there can be defined a series of N oriented filters having random orientation angles θ, but their other characteristics being fixed. There can also be defined a series of N oriented filters having random orientation angles θ as well as random support sizes.

Moreover, the number of N filters in the series may also be a random number.

The characteristics and the properties of the spatial filtering process will be described in detail hereinafter, and a definition will be given of different series of such random elementary filters.

II.1/ Selection-combination method

According to this so-called selection-combination method, first of all the structure of oriented elementary filters having one or more random characteristics is defined. Subsequently, pixels within the supports are selected as a function of their intensity in order to select the pixels which potentially relate to the same object as the instantaneous pixel. Subsequently, a linear combination or mean value of the intensities on each of the elementary filter supports is formed and the results of these mean intensity values are combined so as to yield an intensity which is the filtered intensity to be attributed to the instantaneous pixel.

According to the selection-combination method, the filter supports include the instantaneous pixel $P_0(x_0,y_0)$.

Figure 3A:
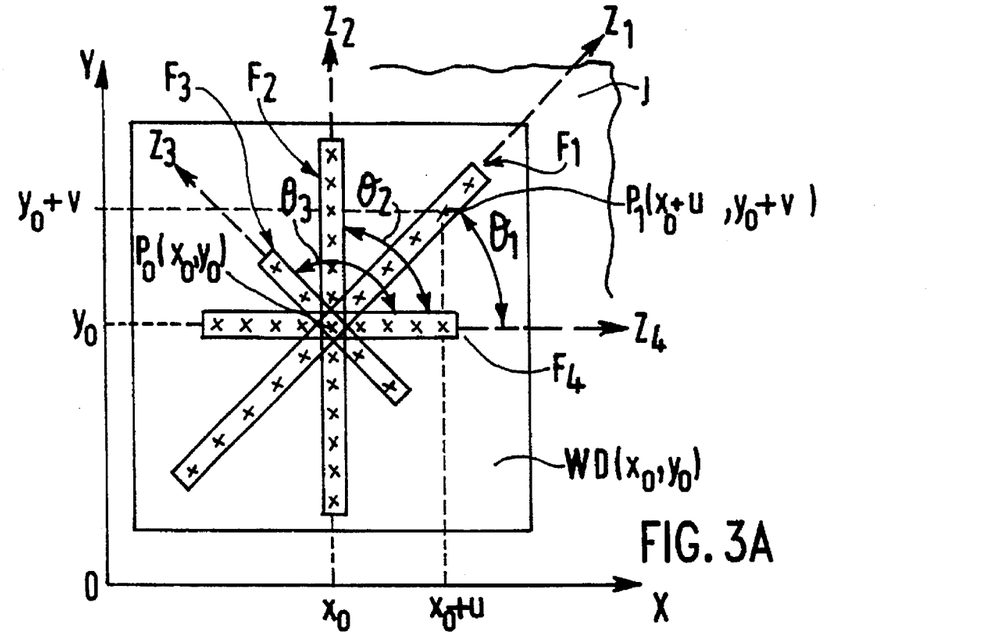
FIGS. 3A to 3D show supports for carrying out a spatial filtering method by SELECTION-COMBINATION.

FIG. 3A shows, by way of example, the definition of a series of N oriented filters $F_1$, $F_2$, $F_3$, $F_4$; for each filter therein:

the orientation angle $\theta_1$, $\theta_2$, $\theta_3$, $\theta_4$ is fixed, the support is of random size, the supports of these filters are symmetrical with respect to the instantaneous pixel $P_0(x_0,y_0)$, and the number N of filters is fixed and equal to 4.

Figure 3B:
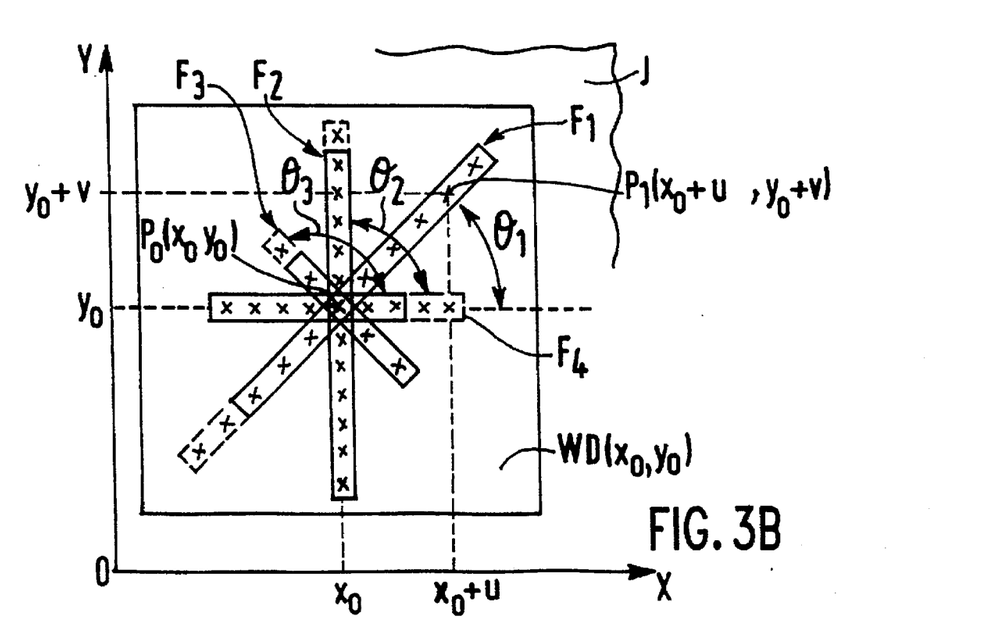

FIG. 3B shows, by way of example, the definition of a series of N oriented fibers $F_1$, $F_2$, $F_3$, $F_4$; for each N oriented fibers $F_1$, $F_2$, $F_3$, $F_4$; for each filter therein:

the orientation angle $\theta_1$, $\theta_2$, $\theta_3$, $\theta_4$ is a random angle, the support is of random size, the supports are asymmetrical with respect to the instantaneous pixel $P_0(x_0,y_0)$, and the number N of filters is fixed and equal to 4.

Figure 3C:
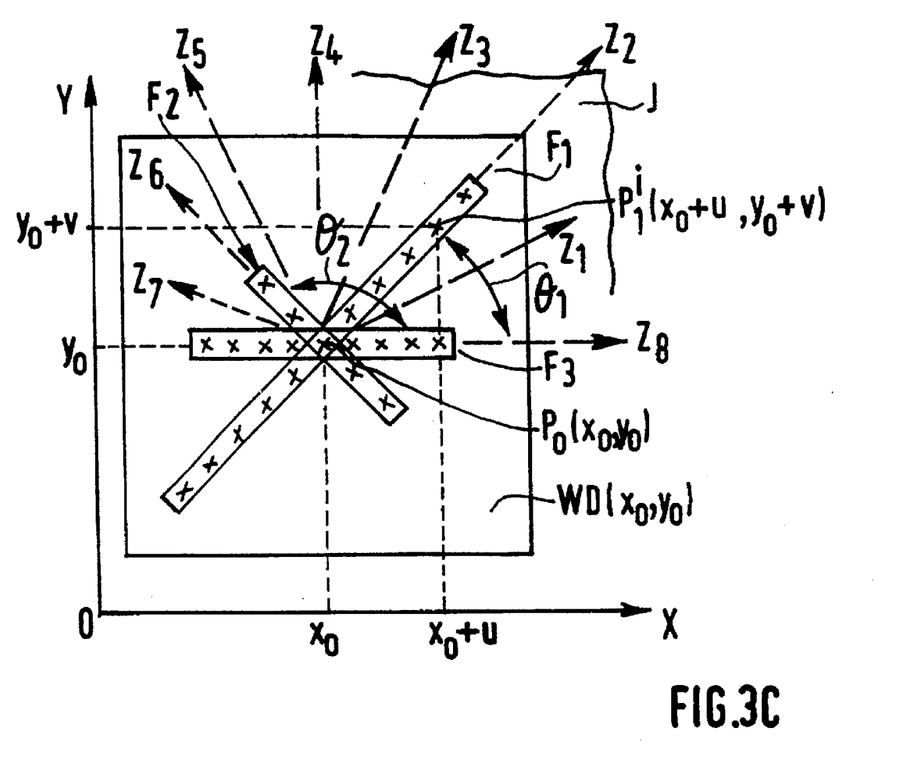

FIG. 3C shows a series of N=3 oriented elementary filters $F_1$, $F_2$, $F_3$; for each filter therein:

the orientation angle $\theta_1$, $\theta_2$, $\theta_3$ is a random angle, the supports are of random size, and (the supports of these filters are symmetrical with respect to the instantaneous pixel $P_0(x_0, y_0)$.

Referring to FIG. 3C, a number $N_{max}$ of fixed potential orientation axes can be fixed for the filters, which axes are regularly distributed in the space around $P_0(x_0,y_0)$. When a number N of filters is chosen to be lower than or equal to $N_{max}$, the filters will be distributed at random along the $N_{max}$ orientation axes. For example, $N_{max}=8$ can be chosen; in that case the 8 possible potential orientation axes $P_0Z_0$, $P_0Z_2$, $P_0Z_3$ ... $P_0Z_8$ are regularly spaced $\pi/8$ apart; the number N of filters may also be chosen to be fixed and equal to 3. These three filters are then distributed at random along the 8 possible fixed directions.

In another example, the number N of filters may be fixed and equal to 4. These filters are then distributed at random along the 8 orientation axes.

In the type of example as illustrated in FIG. 3C, in which the possible orientation axes are fixed, the number N of filters may also be a random number which remains smaller than the number $N_{max}$ of orientation axes.

The size of the filter supports in each of the FIGS. 3A and 3B is 1×K pixels, where K is the number of pixels in the support, said number of K being a random number in each of the two examples. The filters given by way of example, therefore, have monodimensional supports. In other examples (not shown), the filter supports may be two-dimensional, subject to the condition that one of the dimensions must be at least twice the other dimension, the latter dimension being small, for example 2 or 3 pixels. Preferably, the window $WD(x_0,y_0)$ is chosen so as to be 20×20 pixels, thus limiting the major dimension of the filters to at the most 20 pixels in this ease.

Among the random characteristics which can be potentially used in the definition of the series of N oriented elementary filters in order to achieve the objects of the invention, i.e. in order to achieve spatial filtering of the noise without generating patches and without degrading the details, contours and contrast, in descending order of importance it is proposed that:

1) the supports of the N filters $F_1$ to $F_1$ are of random size, for example, with fixed orientations $\theta_1$ to $\theta_N$ and fixed other characteristics as illustrated by FIG. 3A;
2) the supports of the N filters $F_1$ to $F_N$ are of random size and random orientation $\theta_1$ to $\theta_2$, the other characteristics being fixed as illustrated by FIG. 3B;
3) the supports of the N filters $F_1$ to $F_N$ are of random size and random orientation $\theta_1$ to $\theta_N$ and, moreover, the number N of filters is a random number as illustrated by FIG. 3C;
4) the supports are also asymmetrical as illustrated by FIG. 3B;
5) prior to the treatment of each pixel sub-sampling can be performed in the window $WD(x_0,y_0)$ and the starting pixel for sub-sampling may be a random pixel;
6) the mean value MEAN for obtaining either the individual results $R_1$, $R_2$, $R_N$ of the filters or the general result R can be applied to intensities weighted by random weights; to this end there is defined a random coefficient C, linked to the support, equal to the inverse of the sum of the weights, valued between 0 and 1, and applied to each pixel in the support; each of these weights may be equal to 1; the coefficient then equals the inverse 1/K of the number K of pixels contained in the support; the coefficient C of each filter is taken into account so as to realize the weighted linear combination of the intensities.

For example, the result $R_1$ can be obtained by applying random weights $W_1$ to the various intensities $I_1(x_0+u,y_0+v)$ of the filter $F_1$ and by forming the mean value MEAN of these weighted intensities, yielding:

$$R_1 = C \times \Sigma [W_1(u,v) \times I_1(x_0+u, y_0+v)].$$

All above characteristics can be made random, individually or in combination, bearing in mind that for the filter supports the most important characteristics are the random size and the random orientation and for the combination the random number of filters N.

EXAMPLE I the selection-combination method SIG-MEAN-MEAN.

This first SELECTION-COMBINATION method is referred to hereinafter as SIG-MEAN-MEAN in order to simplify the description.

As described above, this method comprises first of all the definition of the oriented filters with:

their random characteristics their fixed characteristics their fixed or random number.

The method subsequently comprises the selection, in each filter support, of a given number of pixels as a function of their intensity difference with respect to the intensity of the instantaneous pixel.

The method subsequently comprises the combination of filters.

Assuming that the instantaneous pixel $P_0$ has the coordinates $(x_0,y_0)$ in the two-dimensional matrix of the image J and that the pixel P being examined has the coordinates $(x_0+u,y_0+v)$, where u and v are integer numbers, the selection is performed for each pixel P having an intensity $I(x_0+u,y_0+v)$, so that:

$$|I(x_0+u, y_0+v) - I_0(x_0,y_0)| < m \times \sigma_B \quad (1)$$

where m is a multiplication factor and where $\sigma_B$ is the noise standard deviation in the image.

The noise standard deviation in the image can be estimated by any known method or can be estimated a priori. The noise standard deviation is measured in grey (or intensities) levels. There may be, for example 5 or 10 grey levels. It is absolutely necessary to make an estimate of the noise standard deviation $\sigma_B$ for correct execution of the method in accordance with the invention.

Hereinafter, the definition of the noise standard deviation as known to those skilled in the art will be stated.

The noise standard deviation $\sigma_B$ is the mean deviation between the noise and its mean value. The noise standard deviation is the square root of the variance $\sigma^2_B$ of the noise in the image. The noise standard deviation can be obtained by applying the method given hereinafter by way of example.

Figure 7A:
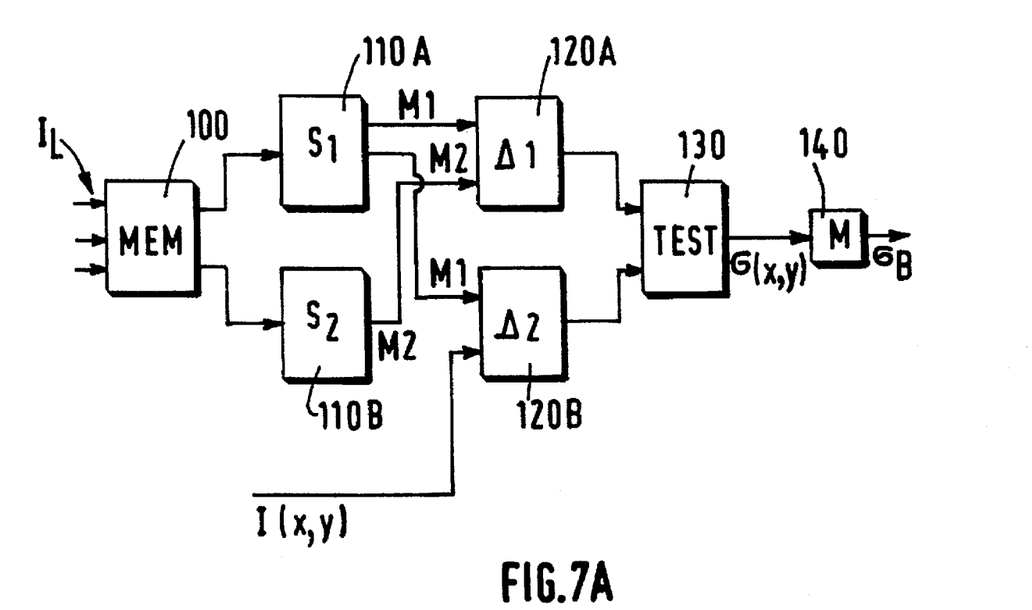
FIGS. 7A and 7B illustrate a method of determining the noise standard deviation.

Referring to the diagram of blocks of FIG. 7A, the method comprises first of all the processing of the image J in rows, pixel-by-pixel, according to a scanning mode which may be a standard scanning mode, i.e. from the top left to the bottom right in the image. During a first step, represented by the block MEM 100, the intensities I(x,y) of the pixels are stored as a function of their coordinates (x,y) in the two-dimensional matrix of the image.

Figure 7B:
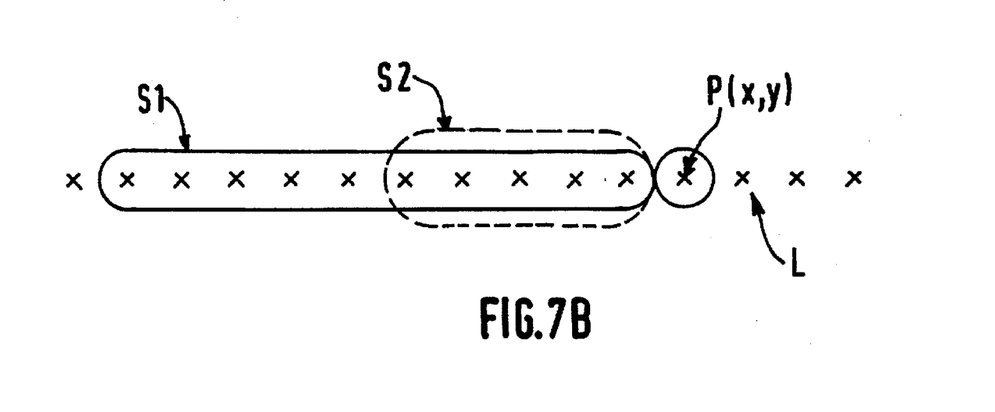

During a second step, represented by the blocks 110A and 110B and illustrated by FIG. 7B, for each instantaneous pixel P(x,y), having coordinates x,y, of a row L of pixels in the image J there are calculated two mean intensity values of the pixels situated to the left of the instantaneous pixel if the scanning direction of the row is towards the right:

a first mean value M1 of the intensities on a large support $S_1$, which calculation is represented by the block 110A, i.e. a mean value of the intensities of a large number of pixels of the row situated to the left of the instantaneous pixel, which pixels have already been scanned; a large support is to be understood to mean approximately 10 pixels;

a second mean value $M_2$ of the intensities on a small support $S_2$, which calculation is represented by the block 110B, i.e. a mean value of the intensities of a number of pixels smaller than that of the large support, for example half the number, so 5 pixels, to the left of the instantaneoupixel ((x,y) of the row.

These first and second mean intensities $M_1$, $M_2$ can be absolute or weighted as known to those skilled in the art. Weighted is to be understood to mean herein that to each pixel intensity for which the mean value is formed a weight is applied between 0 and 1.

During a third step, represented by the block 120A, the method of determining the noise standard deviation $\sigma_B$ comprises the calculation of a value $\Delta_1$ equal to the absolute value of the difference between the first mean intensity $M_1$ on a large support and the second mean intensity $M_2$ on a small support. The evaluation of this difference:

$$\Delta_1 = |M_1 - M_2|$$

enables rejection of pixel intervals, in the row being treated, which contain object edges, i.e. in which an abrupt intensity variation occurs due to the contours of an object; it is declared that an object edge exists in the pixel interval formed by the large support $S_1$ when the second mean intensity value $M_2$ on the small support deviates very much from the first mean intensity value $M_1$ on the large support; i.e. when the difference $\Delta_1$ calculated between these two mean intensity values exceeds a value, estimated in grey levels, which equals approximately 10% of the grey levels used for constructing the digital image J; if an edge is detected, the interval constituted by the pixels of the large support $S_1$ is rejected.

During a fourth step, represented by the block 120B, the method of determining the standard deviation also comprises the calculation of a value $\Delta_2$ which is equal to the absolute value of the difference between the first mean intensity value on the large support and the intensity of the instantaneous pixel I(x,y)

$$\Delta_2 = |M_1 - I(x,y)|$$

The evaluation of this difference enables rejection of the aberrant pixels. The instantaneous pixel is deemed to have an aberrant intensity when the intensity difference $\Delta_2$ between the intensity of the instantaneous pixel I(x,y) and the first mean intensity value $M_1$ on a large support $S_1$ exceeds a value, estimated in grey levels as defined above, of approximately 10% of the grey levels of the image J.

During a final step, represented by the block TEST 130, the method comprises the testing of the above two conditions:

testing if the instantaneous pixel does not have an aberrant intensity, testing if the pixel interval corresponding to the large support does not contain object edges.

If these two conditions are jointly satisfied, it is declared that $\Delta_2$, being the absolute value of the intensity difference between the instantaneous pixel I(x,y) and the first mean intensity value $M_1$ on the large support $S_1$, is an elementary measure $\sigma(x,y)$ retained for the evaluation of the noise standard deviation.

The above sequence of operations is repeated for all pixels of the image J to be treated. Subsequently, an overall mean value M of all elementary measures is formed in the block 140 and retained as the value $\sigma_B$ of the noise standard deviation.

In the relation (1), the multiplying factor m of the noise standard deviation $\sigma_B$ may be equal to 2 or 3. If the noise is Gaussian and an elementary filter is applied to an image zone in which the intensity is substantially uniform, if m=2 approximately ¾ of the pixels are selected, and if m=3 practically all pixels are selected.

By applying the relation (1), all pixels situated within each oriented elementary filter support are examined.

The operation of the SELECTION described above, taking into account the noise standard deviation $\sigma_B$ for selecting pixels of an intensity near that of the instantaneous pixel, is referred to hereinafter as SIG in order to simplify the description.

Figure 3D:
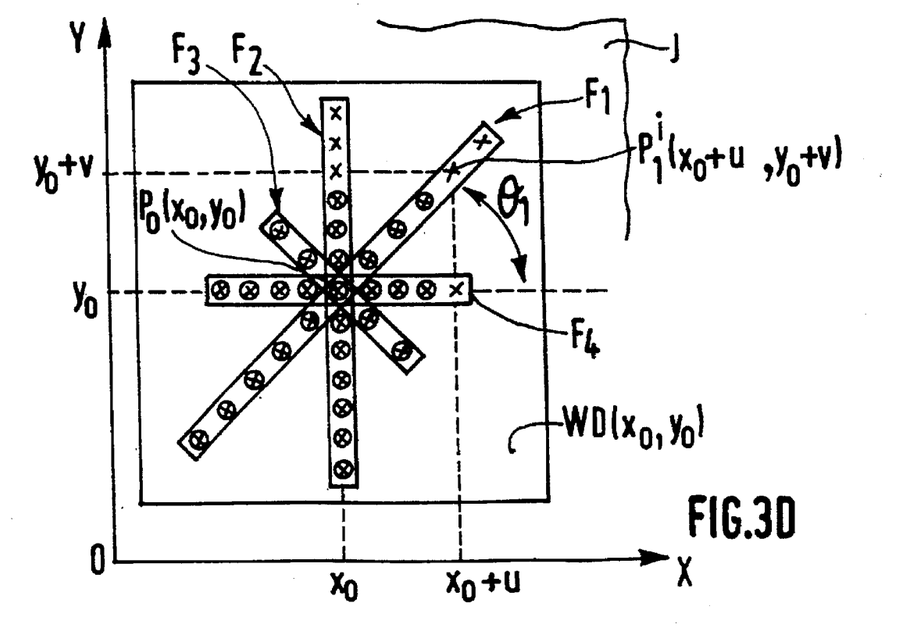

FIG. 3D shows, in an image J, a window $WD(x_0,y_0)$ which is centered around the instantaneous pixel $P_0(x_0,y_0)$, one-dimensional filter supports $F_1$, $F_2$, $F_3$, $F_4$ oriented in various directions in the image plane around the instantaneous pixel $P_0(x_0,y_0)$; the pixels selected by SIG are indicated by enclosure by a circle.

At the end of the operation SELECTION SIG, a linear combination or mean value of the intensities of the selected pixels is formed. This averaging operation is referred to hereinafter as MEAN.

Figure 4A:
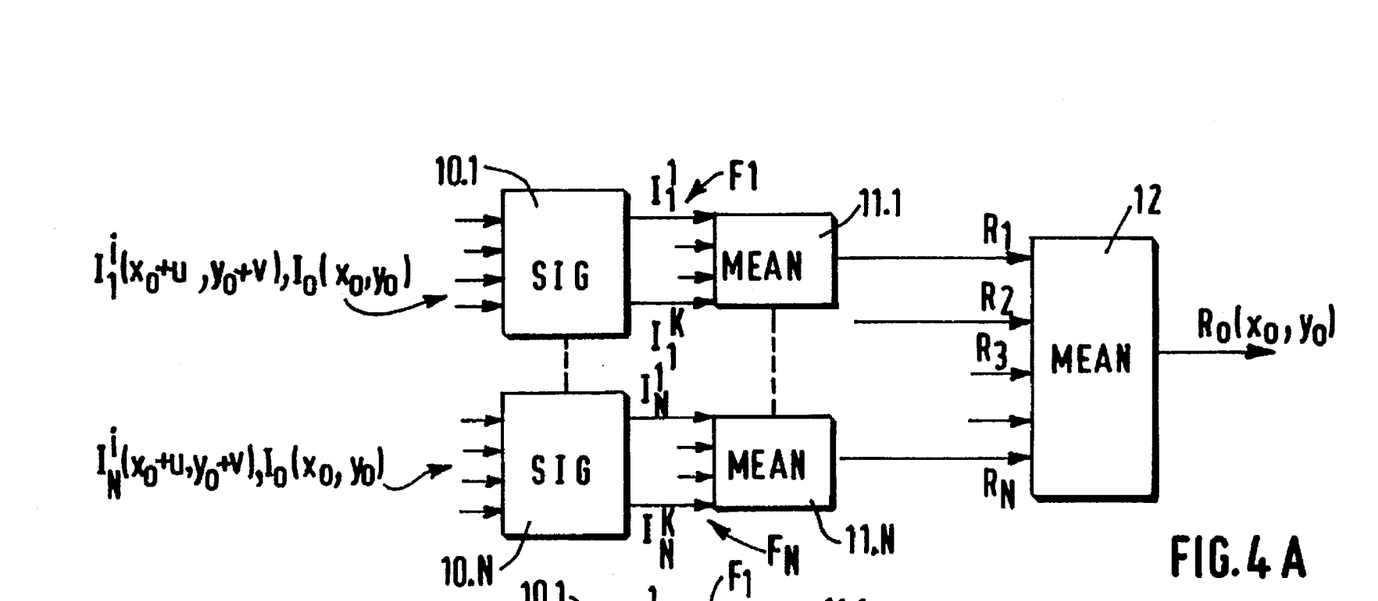
FIGS. 4A to 4D illustrate the combination of the filters of the FIGS. 3A to 3D.

Referring to FIG. 4A, showing a diagram representing the filtering, by SELECTION-COMBINATION SIG-MEAN-MEAN, by means of a series of filters as illustrated in FIG. 3D, the filter $F_1$ performs the selection of the pixels, represented by the block SIG 10.1, and calculates, in the block MEAN 11.1, a first mean value $R_1$ of the various intensities $I^i_1(x_0+u,y_0+v)$ of the pixel selected in $F_1$, with:

$$R_1 = \text{MEAN}\,[I^i_1(x_0+u,y_0+v)]$$

so that $$|I^i_1(x_0+u,y_0+v) - I_0(x_0,y_0)| < k \times \sigma_B \qquad (1)$$

where $(x_0+u,y_0+v)$ describes the oriented support of the filter $F_1$.

Subsequently, in the block MEAN 11.2 the filter $F_2$ calculates a second mean value $R_2$ of the various intensities $I^i_2(x_0+u,y_0+v)$ of the pixels selected in a block SIG 10.2, with:

$$R_2 = \text{MEAN}\,[I^i_2(x_0+u,y_0+v)]$$

in which the intensity of the selected pixels satisfies the relation (1), $(x_0+u,y_0+v)$ describing the oriented support of the filter $F_2$.

The operation is performed analogously up to and including the filter $F_N$ (SIG 10.N, MEAN 11.N):

$$R_N = \text{MEAN}\,[I_N^i(x_0+u,y_0+v)]$$

in which the various intensities $I_N^i(x_0+u,y_0+v)$ of the selected pixels satisfy the relation (1), $(x_0+u,y_0+v)$ describing the oriented support of the filter $F_N$.

When all mean values $R_1$ to $R_N$ have been obtained by means of the oriented filters $F_1$ to $F_N$, from said mean values $R_1$ to $R_N$, a mean value MEAN is formed in MEAN 12, yielding the filtered intensity $R_0(x_0,y_0)$ to be applied ultimately to the instantaneous pixel $P_0(x_0,y_0)$:

$$R_0(x_0,y_0) = \text{MEAN}\,[R_1, R_2 \ldots R_N]$$

EXAMPLE II the selection-combination method SIG-MEAN-MED

For simplicity of the description this second selection-combination method is referred to as SIG-MEAN-MED. At the end of the operation defining the series of N oriented elementary filters with:

their random characteristics
their fixed characteristics,
their random or fixed number, the operation for selecting pixels in each filter support is performed as in example I, by applying the criterion (1) relating to the intensity of pixels and by taking into account the noise standard deviation $\sigma_B$.

Figure 4B:
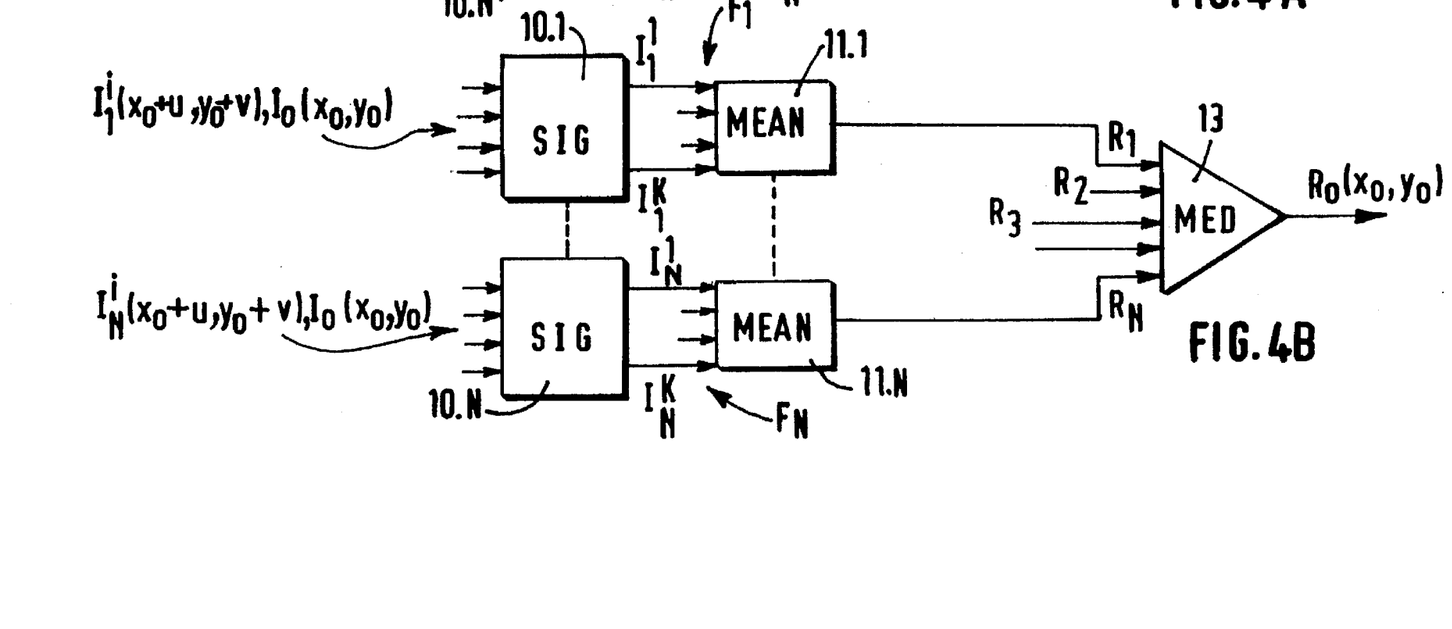

Subsequently, referring to FIG. 4B, the specific results $R_1$ to $R_N$ of the filters $F_1$ to $F_N$ are obtained by forming a mean value MEAN of the various respective intensities $I_1^i(x_0+u,y_0+v)$ to $I_N^i(x_0+u,y_0+v)$ of the filters $F_1$ to $F_N$, and then the intensities $R_1$ to $R_N$ resulting from said averaging are combined by a median filter which is designated by the reference MED 13 and supplies the resultant intensity $R_0(x_0,y_0)$:

$$R_0(x_0,y_0) = \text{MED}\,[R_1, R_2 \ldots R_N].$$

A median filter is a filter which classifies the intensities presented thereto, with a sequence number, from the smallest to the highest intensity, and outputs the intensity whose value is that of the number situated at the halfway point of the set of numbers or, if the number of numbers is not odd, the mean value of the intensity corresponding to the two numbers at the halfway point.

The advantage of the SIG-MEAN-MED method consists in that the median filter used has high-frequency noise injection properties which makes it especially suitable to avoid the effect of patches in the image. Actually, the median filter selects one of the results, between $R_1$ and $R_N$, being the value situated at the center of these intensity values, instead of a mean value of these intensities. The result $R_0(x_0,y_0)$ obtained by MEDIAN is an intensity which is much more decorrelated, from an instantaneous pixel being treated to the next instantaneous pixel treated, than the intensity resulting from MEAN 12 in the above example I.

EXAMPLE III

The selection-combination method KNN

Hereinafter the third selection-combination method is referred to as KNN for the sake of simplicity of the description.

In this example, another method of selection as a function of the intensity is applied instead of the criterion (1) which takes into account the noise standard deviation $\sigma_B$. This other selection method consists in retaining all pixels whose intensity deviates the least from that of the instantaneous pixel. To this end, the intensity differences $$\Delta(x_0,y_0) = |I(x_0+u,y_0+v) - I_0(x_0,y_0)| \qquad (2)$$

between the pixels in each of the filters and the intensity of the instantaneous pixel are calculated.

According to this method, referred to as K NEAREST NEIGHBORS or KNN, actually a fixed number K of pixels having the intensity nearest to that of the instantaneous pixel is selected.

Figure 4C:
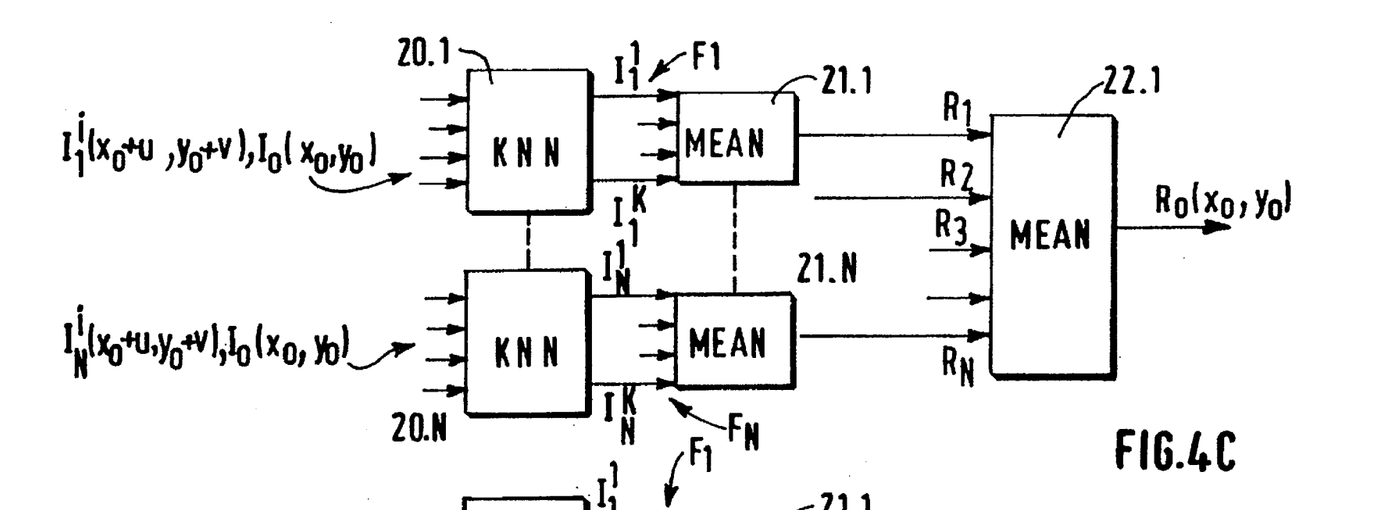
Figure 4D:
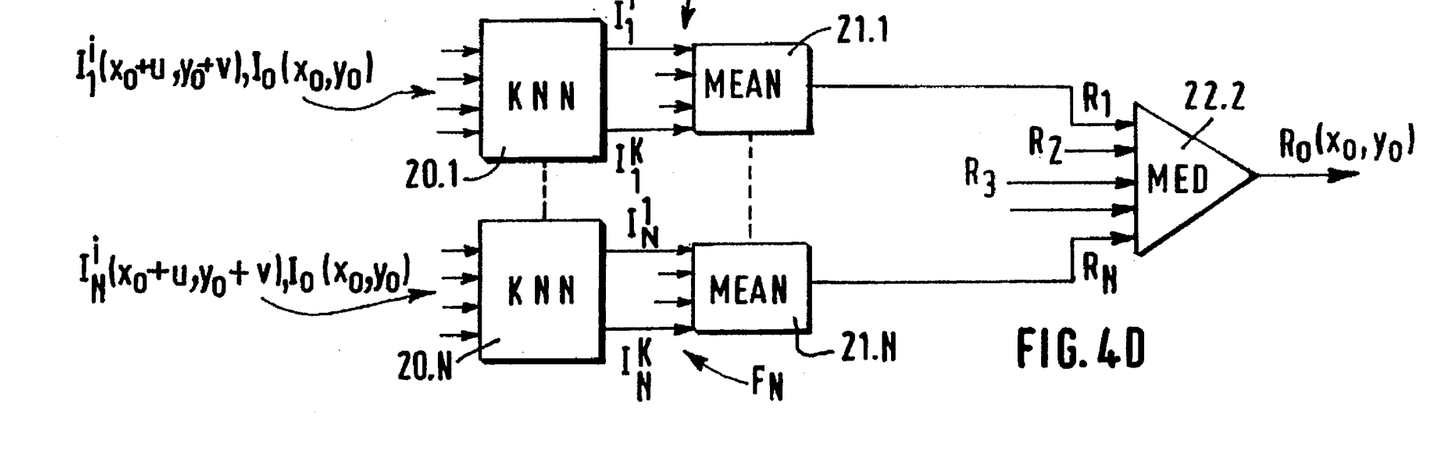

All other characteristics and steps of the method KNN may be identical to those of example I or example II and are illustrated by the FIGS. 4C and 4D.

In these Figures, the blocks KNN 20.1 to KNN 20.N represent the pixel selection steps, and the blocks MEAN 21.1 to MEAN 21.N represent the formation of the mean values of the intensities of pixels selected in the filters.

The blocks MEAN 22.1 and MED 22.2 form a mean value of and perform median filtering on, respectively, the specific results of the elementary filters in order to produce the final result $R_0(x_0,y_0)$.

II.2/ The FMH method

In the steps of the above method a series of N impulse-response elementary linear filters forming mean values is defined; moreover, their responses are combined by median filters so that this class of filters is referred to as FMH (FIR Hybrid Median Filters). This combination has a tree structure which includes the averaging linear filters (FIR) and the median filters (MED).

In the FIGS. 5A to 5D a two-dimensional window $WD(x_0, y_0)$ is defined which is centered around the instantaneous pixel $P_0(x_0,y_0)$ which has the coordinates $(x_0,y_0)$, in the two-dimensional matrix of the image J to be processed. In this window $WD(x_0,y_0)$ filter supports are defined along the rows of pixels, the columns of pixels and the two diagonals between the rows and the columns. The central pixel $P_0(x_0, y_0)$ of the window $WD(x_0,y_0)$, being the instantaneous pixel, is considered separately.

Figure 5A:
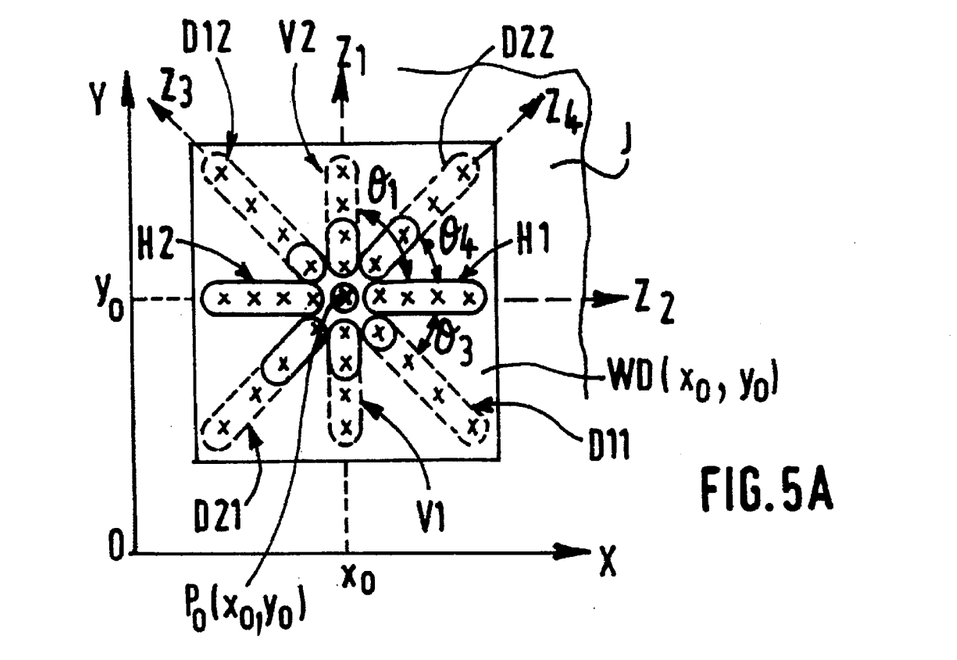
FIGS. 5A and 5D show filter supports FMH.

FIG. 5A shows, by way of example, a series of N oriented filters $H_1$, $H_2$, $V_1$, $V_2$, $D_{11}$, $D_{12}$, $D_{21}$, $D_{22}$; for each filter:

the orientation is fixed, considered, for example, with respect to the axis OX, according to the vertical $\theta_1$, the horizontal $\theta_2$ (angle not shown) and the diagonals $\theta_3$, $\theta_4$ passing through the instantaneous pixel, being the center of the square forming the window, the support is of random size: the supports are one-dimensional, i.e. they have a width of 1 pixel and a length which is limited by the edge of the window $WD(x_0,y_0)$, the supports of the filters $H_1$, $H_2$, arranged in the same direction, for example the horizontal direction, are symmetrical. The same holds for the filter supports $V_1$ and $V_2$ arranged in the vertical direction, the filter supports $D_{11}$ and $D_{12}$ arranged in the first diagonal direction, and the filter supports $D_{12}$, $D_{22}$ arranged in the second diagonal direction, the number N of filters is fixed; in this case this number is 8, and these filter supports are arranged in space according to all possible orientation angles $\theta_1$ to $\theta_4$, multiples of $\pi/4$, the series of filters includes the central pixel $P_0(x_0,y_0)$ of the window and its intensity is considered separately.

Figure 5B:
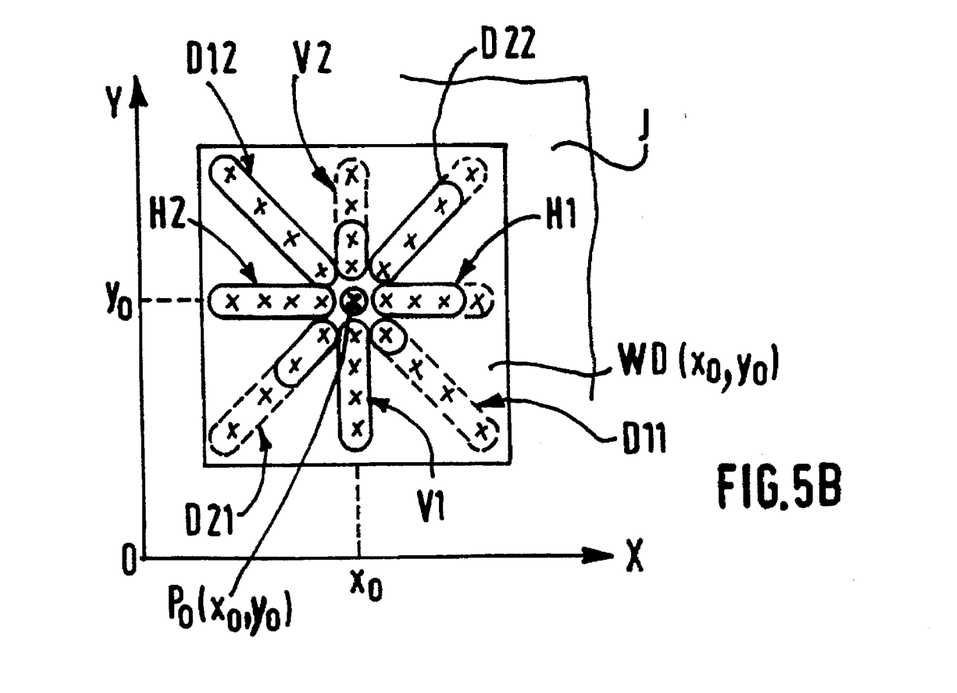

FIG. 5B shows a series of filters of the same type which have the following characteristics as compared with FIG. 5A:

the filter supports which are arranged in the same direction are asymmetrical in a random manner.

Figure 5C:
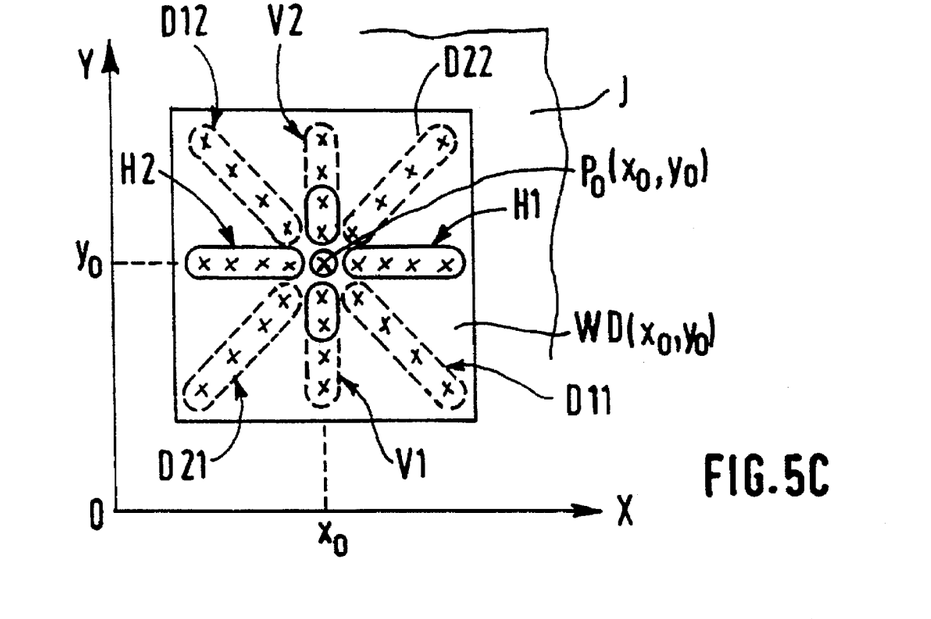
Figure 5D:
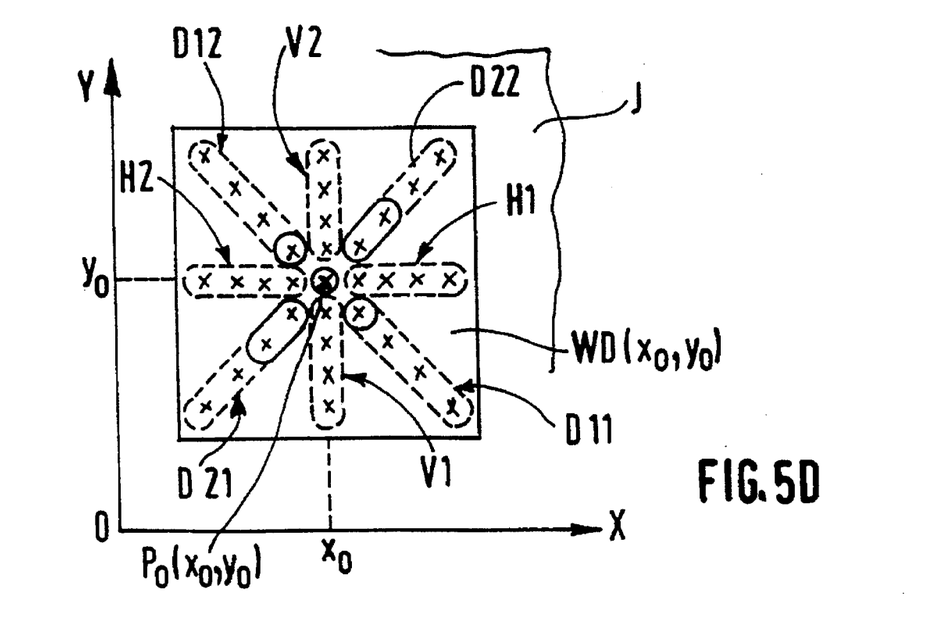

In the FIGS. 5C and 5D only two axes are considered instead of considering a number of filters arranged according to all potential orientation angles $\theta_1$, $\theta_2$, $\theta_3$, $\theta_4$: the horizontal and vertical axes and the horizontal axis in FIG. 5C, and the axes formed by the directions of the two diagonals in FIG. 5D. Therefore, in FIG. 5C the series of filters comprises only the supports $H_1$, $H_2$, $V_1$, $V_2$ aligned with said horizontal and vertical axis, and in FIG. 5D the series of filters comprises only the supports $D_{11}$, $D_{12}$, $D_{21}$ and $D_{22}$ arranged according to said diagonal axes. The supports in the FIGS. 5C and 5D are of random size and are symmetrical with respect to the instantaneous pixel.

Referring to the FIGS. 6A to 6C, the filters having the supports with random characteristics as described with reference to the FIGS. 5A to 5D first of all form the linear combination or mean value MEAN of the intensities of the pixels on their support.

$I^i_{V1}$, $I^i_{V2}$, $I^i_{H1}$, $I^i_{H2}$ denote the various intensities of the pixels situated on the supports $V_1$, $V_2$, $H_1$ and $H_2$, respectively.

The various intensities of the pixels situated on the supports $D_{11}$, $D_{12}$, $D_{21}$, $D_{22}$ are referred to as $I^i_{D11}$, $I^i_{D12}$, $I^i_{D21}$, $I^i_{D22}$, respectively.

The mean values formed in the blocks MEAN 31.1 to MEAN 31.8 by the filters $H_1$, $H_2$, $V_1$, $V_2$, $D_{11}$, $D_{12}$, $D_{21}$, $D_{22}$ are the intensities $I_{H1}$, $I_{H2}$, $I_{V1}$, $I_{V2}$, $ID_{11}$, $ID_{12}$, $I_{D21}$ and $I_{D22}$, respectively.

Figure 6A:
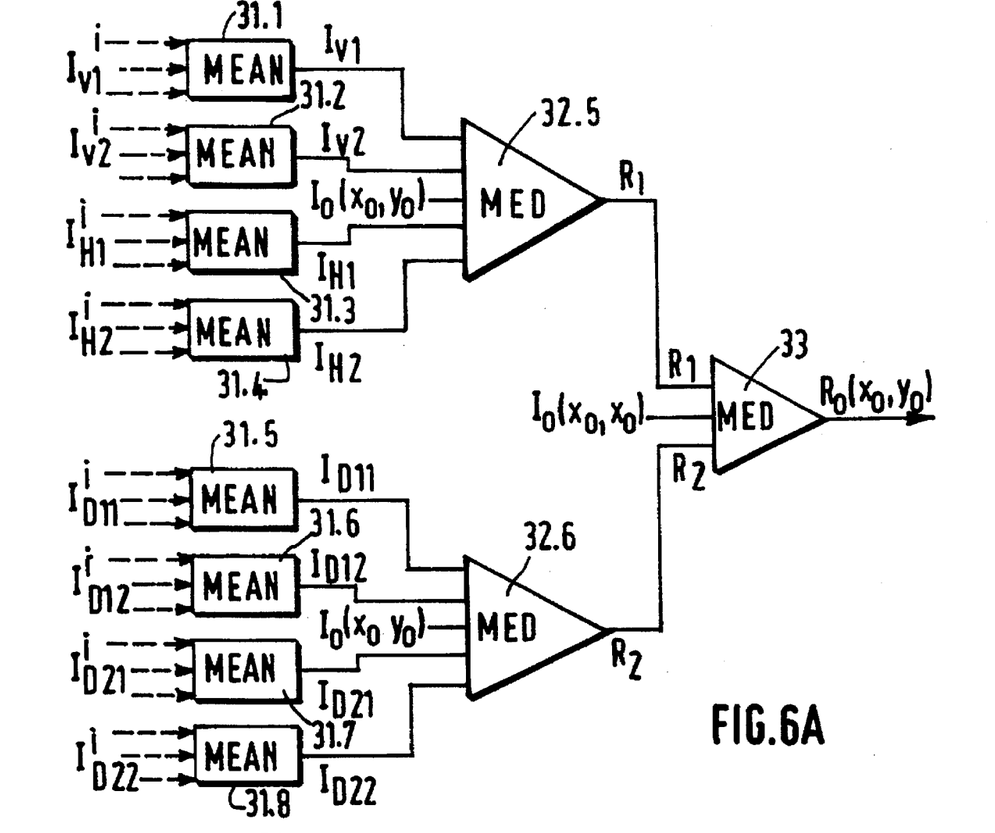
FIGS. 6A to 6C illustrate the combination of the filters of the FIGS. 5a to 5d.

In FIG. 6A the tree-type combination of the results of the preceding averaging filters MEAN comprises 2 levels, including the introduction into a 5-value median filter MED 32.5 of the mean intensities $I_{V1}$, $I_{V2}$, $I_{H1}$, $I_{H2}$ on the horizontal and the vertical axis plus the intensity $I_0(x_0,y_0)$ of the central pixel; included in parallel is the introduction into a 5-value median filter MED 32.6 of the mean intensities $I_{D11}$, $I_{D12}$, $I_{D21}$, $I_{D22}$ in the two diagonal directions plus the intensity $I_0(x_0,y_0)$ of the central pixel. These two median filters supply the resultant intensities $R_1$ and $R_2$, respectively, thus terminating the first level of the tree.

The two intensities $R_1$ and $R_2$ calculated at the first tree level are introduced, together with the intensity $I_0(x_0,y_0)$ of the central filter, into another, 3-value median filter MED 33 which supplies the resultant intensity $R_0(x_0,y_0)$ to be applied as the filtered intensity value of the instantaneous pixel $P_0(x_0,y_0)$.

Figure 6B:
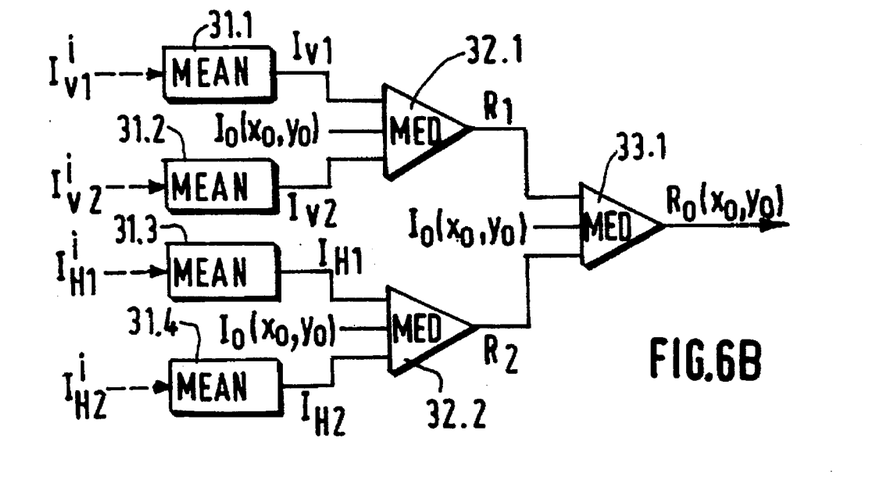

In FIG. 6B the combination also comprises two levels, but it is applied only to the mean intensity values $I_{V1}$, $I_{V2}$, $I_{H1}$, $I_{H2}$ relating exclusively to the vertical and the horizontal direction, respectively. This combination comprises the introduction of the mean intensity values $I_{V1}$, $I_{V2}$ plus the noisy intensity $I_0(x_0,y_0)$ of the central pixel into a 3-value median filter MED 32.1 in order to supply a resultant intensity $R_1$, and also comprises the introduction of mean intensity values $I_{H1}$, $I_{H2}$ in parallel into a 3-value median filter MED 32.2 in order to supply a resultant intensity $R_2$.

The intensifies $R_1$ and $R_2$ calculated at the first tree level are introduced, together with the intensity $I_0(x_0,y_0)$ of the central pixel, into a new 3-value median filter MED 33.1 which supplies the resultant intensity $R_0(x_0,y_0)$ to be applied as the filtered intensity value of the instantaneous pixel $P_0(x_0,y_0)$.

In a further combination (not shown) the mean intensity values $I_{V1}$, $I_{V2}$, $I_{H1}$, $I_{H2}$ of FIG. 6B can be replaced by the mean values obtained in the same circumstances on the two diagonals, so $I_{D11}$, $I_{D12}$, $I_{D21}$, $I_{D22}$, respectively, in order to form another combination of two-level filters on two axes only, being those of the two diagonals.

Figure 6C:
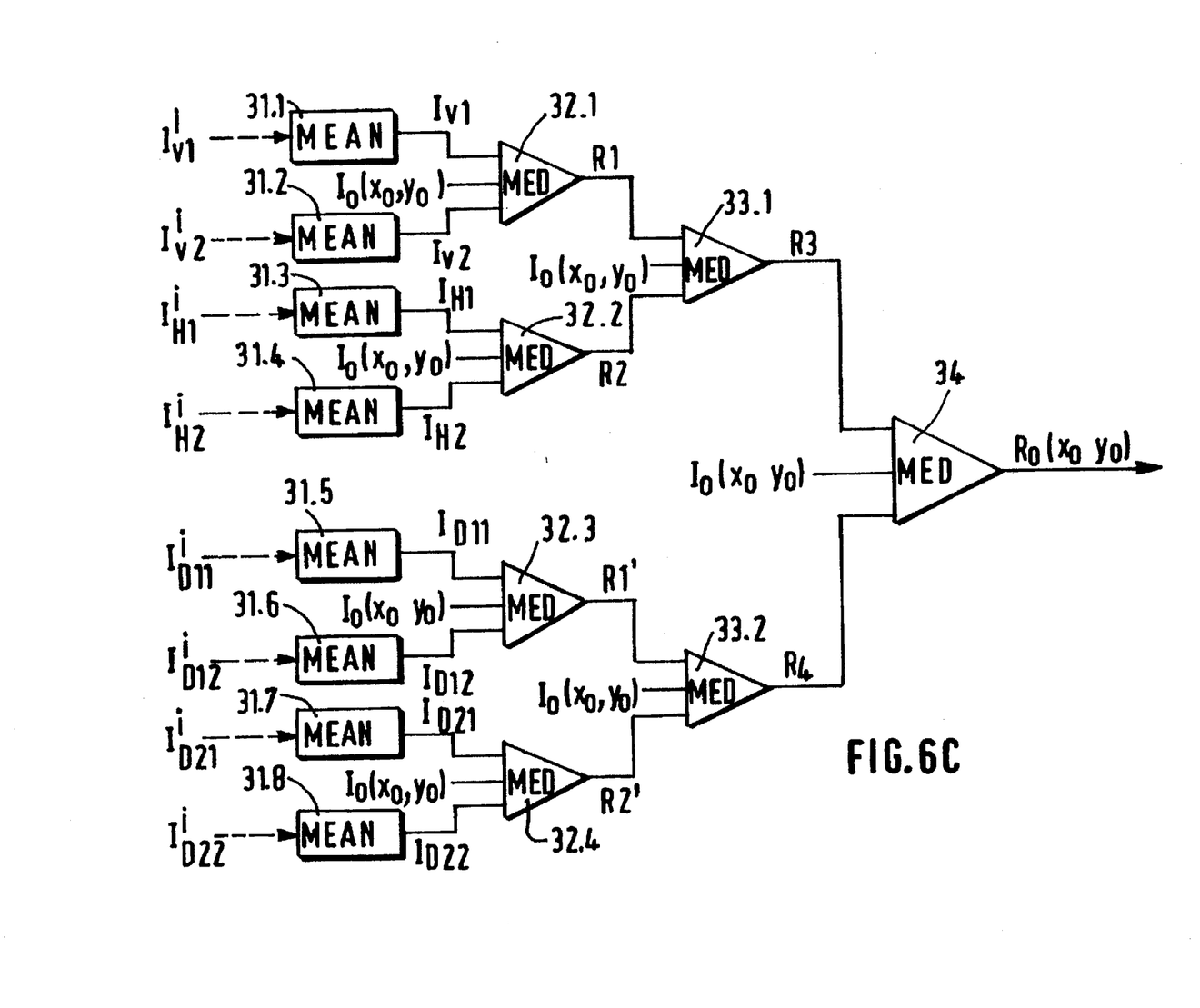

In FIG. 6C the tree combination comprises 3 levels. The first two levels are formed as described with reference to FIG. 6B for the combination of two horizontal and vertical axes and offers a result $R_3$ via MED 33.1; in parallel, as described above, there is the combination of the filters on the two diagonal axes, yielding a result $R_4$ via MED 33.2.

The first result $R_3$ and the second result $R_4$ are subsequently combined with the noisy intensity $I_0(x_0,y_0)$ of the instantaneous pixel in a 3-value median filter MED 34 in order to output, at the third level, the resultant intensity $R_0(x_0,y_0)$ to be applied as the filtered intensity value of the instantaneous pixel $P_0(x_0,y_0)$.

The intensity of an instantaneous pixel is filtered by the series of random elementary filters defined beforehand in accordance with the proposed selection and combination steps, after which the intensities of other desired pixels of the image are filtered until all desired pixels of the image have been subjected to the proposed method, i.e. filtering of the intensity of each desired pixel by means of a series of elementary filters whose characteristics, being fixed or random, have been defined beforehand as well as the method of forming the intensity combinations.

We claim:

1. A method for spatial filtering of noise in an image (J) in the form of a matrix of pixels [P(x,y)] having noisy digitized intensity values [I(x,y)], which method comprises the steps of:

a) selection, in a sliding window [WD($x_0,y_0$)] centered around an instantaneous pixel, of a number (N≠0) of random oriented elementary filters [$F_1$, $F_2$, . . . ; $V_1$, $V_2$, . . . ] having supports with an axis of orientation axis [$P_0Z_1$, $P_0Z_2$, . . . $P_0Z_N$] passing through the instantaneous pixel and having characteristics, one or several of which have random values, and b) combination of the intensities of pixels on said supports individually, yielding an elementary intensity, and combination of the elementary intensities, yielding a filtered intensity [$R_0(x_0,y_0)$] to be applied to the instantaneous pixel.

2. A method as claimed in one of the claim 1, in which said filter supports are one-dimensional supports with the pixels aligned on the axes of orientation, or are two-dimensional supports with the dimension of the support parallel to the axis of orientation being at least twice the transverse dimension.

3. A method as claimed in claim 1, in which the steps defined for a pixel to be treated are repeated for all pixels to be treated in the image.

4. A method as claimed in claim 1, in which the filter supports have potentially among the characteristics of which one or more have random values:

their number (N) in the series, an orientation angle [$\Theta_1$, $\Theta_2$, . . . $\Theta_N$] between the axis of orientation [$P_0Z_1$, $P_0Z_2$, . . . , $P_0Z_N$] and a reference axis (OX) defined in the two-dimensional matrix, a defined size in respect of number of pixels whose largest dimension extends parallel to the axis of orientation, an asymmetry with respect to the instantaneous pixel, a coefficient linked to the weighting coefficients applied to the intensities of the pixels.

5. A method as claimed in claim 4, in which said filter supports are one-dimensional supports with the pixels aligned on the axes of orientation, or are two-dimensional supports with the dimension of the support parallel to the axis of orientation being at least twice the transverse dimension.

6. A method as claimed in claim 4, in which:

the potential orientation angles $[\Theta_1, \Theta_2, \ldots \Theta_N]$ are fixed and regularly distributed in space, the number (N), being fixed or random, of random elementary filters is smaller than or equal to the number ($N_{max}$) of orientation angles, and the axes of orientation of the supports of these elementary filters are arranged according to said orientation angles in a fixed or random manner.

7. A method as claimed in claim 1, in which sub-sampling of the pixels of the window is potentially carrier out with a starting pixel of said sub-sampling being situated at random.

8. A method as claimed in claim 7, in which said filter supports are one-dimensional supports with the pixels aligned on the axes of orientation, or are two-dimensional supports with the dimension of the support parallel to the axis of orientation being at least twice the transverse dimension.

9. A method as claimed in claim 7, in which:

the potential orientation angles $[\Theta_1, \Theta_2, \ldots \Theta_N]$ are fixed and regularly distributed in space, the number (N), being fixed or random, of random elementary filters is smaller than or equal to the number ($N_{max}$) of orientation angles, and the axes of orientation of the supports of these elementary filters are arranged according to said orientation angles in a fixed or random manner.

10. A method as claimed in claim 7, in which sub-sampling of the pixels of the window is potentially carried out with a starting pixel of said sub-sampling being situated at random.

11. A method as claimed in claim 10, in which said filter supports are one-dimensional supports with the pixels aligned on the axes of orientation, or are two-dimensional supports with the dimension of the support parallel to the axis of orientation being at least twice the transverse dimension.

12. A method as claimed in claim 1, in which:

the potential orientation angles $[\Theta_1, \Theta_2, \ldots \Theta_N]$ are fixed and regularly distributed in space, the number (N), being fixed or random, of random elementary filters is smaller than or equal to the number ($N_{max}$) of orientation angles, and the axes of orientation of the supports of these elementary filters are arranged according to said orientation angles in a fixed or random manner.

13. A method as claimed in claim 12, in which:

the number of fixed axes of orientation amounts to four, arranged in the direction of the row, the column and the two diagonals passing through the instantaneous pixel, in the window, the supports, situated to both sides of the instantaneous pixel, are positioned so as to exclude the instantaneous pixel in the row ($H_1, H_2$), in the column ($V_1, V_2$), on the first diagonal ($D_{11}, D_{12}$) and on the second diagonal ($D_{21}, D_{22}$) passing through the instantaneous pixel, the instantaneous pixel, being situated centrally in the window [$WD(x_0,y_0)$], is considered to be a specific support, and the combination of the elementary intensities takes into account the intensity of the instantaneous pixel.

14. A method as claimed in claim 13, in which the combination of the intensifies of the pixels on the supports is linear, and the combination of the elementary intensities is performed by median filters at two or three levels, taking into account the intensity of the instantaneous pixel.

15. A method as claimed in claim 12, in which:

the random elementary filter supports include the instantaneous pixel, which method also comprises, between the step a) and the step b), a step:

a) for selection (SIG, KNN) of the pixels as a function of their intensity on each elementary filter support in conformity with a criterion which retains the pixels of intensity near that of the instantaneous pixel in order to estimate their belonging to the same object of the image.

16. A method as claimed in claim 15, in which the criterion for the selection of the pixels retains the pixels having an intensity [$I(x_0+u,y_0+v)$] such that the absolute value of the difference between said intensity and the intensity [$I_0(x_0,y_0)$] of the instantaneous pixel is smaller than a multiple (m) of the noise standard deviation ($\sigma_B$) in the image (J).

17. A method as claimed in claim 15, in which:

for the selection of pixels the criterion retains the pixels as a predetermined number (K) in the support.

18. A method as claimed in claim 16, in which the combination of the intensities of the pixels on the supports is linear and the combination of the elementary intensities is performed by an averaging filter (MEAN).

19. A method as claimed in claim 16, in which the combination of the intensities of the pixels on the supports is linear and the combination of the elementary intensities is performed by a median filter (MED).

20. A device for assistance in the observation of a medical image, comprising:

a system for supplying data of an image in the form of a two-dimensional matrix of pixels having digitized intensity values, a display system for displaying the image, an image processing system having access to the image data and to the display system, which image processing system is configured for spatial filtering of the noise in an image (J) in the form of a matrix of pixels [$P(x,y)$] having noisy digitized intensity values [$I(x,y)$], and comprises:

a) means for selection, in a sliding window [$WD(x_0,y_0)$] centered around an instantaneous pixel [$P_0(x_0,y_0)$], of a number (N≠0) of random oriented elementary filters [$F_1, F_2, \ldots$ ; $V_1, V_2, \ldots$ ] having supports with an axis of orientation axis [$P_0Z_1, P_0Z_2, \ldots P_0Z_N$] passing through the instantaneous pixel and having characteristics, one or several of which have random values, and b) means for combination of the intensities of pixels on said supports individually, yielding an elementary intensity, and combination of the elementary intensities, yielding a filtered intensity [$R_0(x_0,y_0)$] to be applied to the instantaneous pixel.

* * * * *